United States Patent
Knieling et al.

(10) Patent No.: US 9,708,168 B2
(45) Date of Patent: Jul. 18, 2017

(54) ROTARY DISTRIBUTOR FOR DISTRIBUTING FREE-FLOWING MEDIA

(71) Applicant: KRONES AG, Neutraubling (DE)

(72) Inventors: Erwin Knieling, Pfatter (DE); Ludwig Berner, Neutraubling (DE); Markus Schoenfelder, Regensburg (DE)

(73) Assignee: KRONES AG (DE)

(*) Notice: Subject to any disclaimer, the term of this patent is extended or adjusted under 35 U.S.C. 154(b) by 228 days.

(21) Appl. No.: 14/754,030

(22) Filed: Jun. 29, 2015

(65) Prior Publication Data

US 2015/0375981 A1 Dec. 31, 2015

(30) Foreign Application Priority Data

Jun. 27, 2014 (DE) .................. 10 2014 109 082

(51) Int. Cl.
- *B65B 37/00* (2006.01)
- *B67C 3/22* (2006.01)
- *B67C 3/28* (2006.01)
- *F16L 41/02* (2006.01)
- *F16L 58/08* (2006.01)

(Continued)

(52) U.S. Cl.
CPC ............... *B67C 3/225* (2013.01); *B67C 3/22* (2013.01); *B67C 3/28* (2013.01); *F16L 39/06* (2013.01); *F16L 41/02* (2013.01); *F16L 41/03* (2013.01); *F16L 58/08* (2013.01); *F16L 58/10* (2013.01); *F16L 58/14* (2013.01)

(58) Field of Classification Search
CPC B67C 3/225; F16L 39/06; F16L 58/10; F16L 58/14; F16L 58/08

See application file for complete search history.

(56) References Cited

U.S. PATENT DOCUMENTS

2015/0226358 A1* 8/2015 Boatman ............... F16L 39/06
285/272

FOREIGN PATENT DOCUMENTS

| CN | 102168777 | 8/2011 | ............... F16J 15/20 |
| CN | 102352943 | 2/2012 | ............... F16L 39/06 |

(Continued)

OTHER PUBLICATIONS

Extended European Search Report (no translation) issued in application No. 15174065.1, dated Nov. 17, 2015 (5 pgs).

(Continued)

*Primary Examiner* — Jason K Niesz
(74) *Attorney, Agent, or Firm* — Hayes Soloway P.C.

(57) ABSTRACT

A distributor for distributing free-flowing media has a distributor shaft with a distributor head, which is rotatable relative to the distributor shaft with respect to a predetermined axis of rotation D. The distributor head has at least one inlet opening for delivering the free-flowing medium and a plurality of outlet openings for discharging the free-flowing medium. A flow connection exists between this inlet opening and the outlet openings. The distributor shaft has at least one first distributor shaft segment and a second distributor shaft segment. The second distributor shaft is releasably disposed on the first distributor shaft segment closer to the distributor head than the first distributor shaft segment, and has a surface facing the free-flowing medium. The first distributor shaft segment and the second distributor shaft segment differ with regard to their materials and/or their surface coating.

14 Claims, 9 Drawing Sheets

(51) Int. Cl.
*F16L 58/10* (2006.01)
*F16L 58/14* (2006.01)
*F16L 41/03* (2006.01)
*F16L 39/06* (2006.01)

(56) References Cited

FOREIGN PATENT DOCUMENTS

| CN | 202546094 | 11/2012 | ............ F16L 39/06 |
| DE | 102005025027 | 12/2006 | ............ F16L 27/08 |
| DE | 19815134 | 5/2007 | ............ B23B 19/02 |
| DE | 102007062470 | 6/2009 | ............ F16J 15/32 |
| EP | 2030942 | 3/2009 | ............ B67C 3/22 |

OTHER PUBLICATIONS

Chinese First Office Action issued in application No. 2015103618388, dated Dec. 28, 2016 (10 pgs).
German Search Report (no translation) issued in application No. 10 2014 109 082.9, dated. Mar. 18, 2015 (6 pgs).

* cited by examiner

Fig. 16
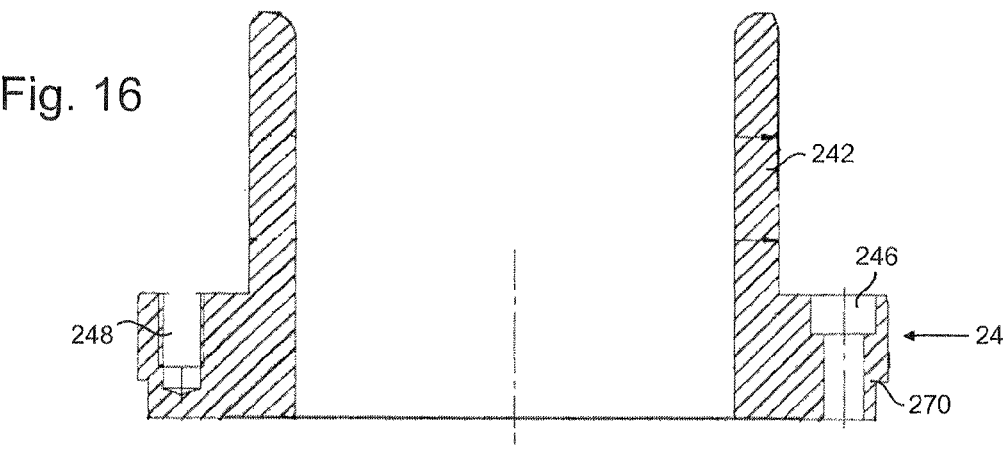
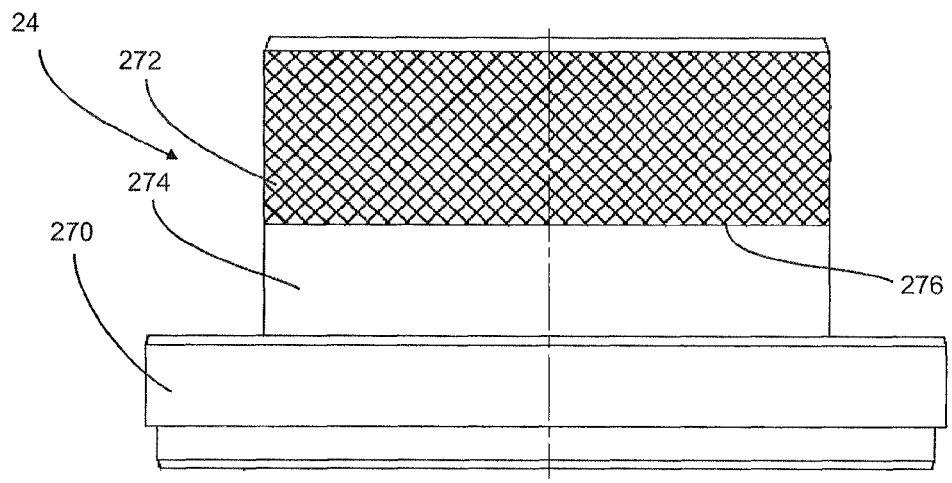
Fig. 17
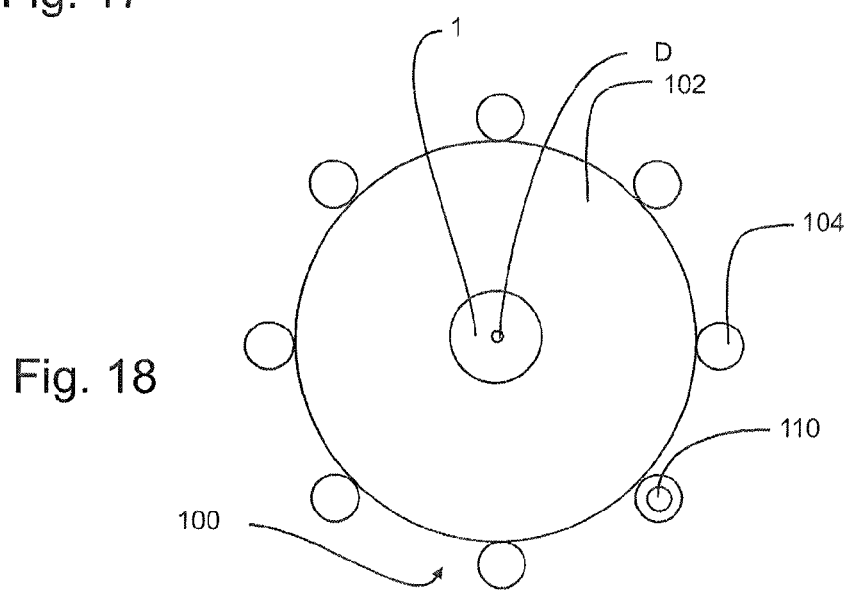
Fig. 18

ROTARY DISTRIBUTOR FOR DISTRIBUTING FREE-FLOWING MEDIA

The present invention relates to a distributor and in particular a rotary distributor for distributing free-flowing media. Such rotary distributors have been known for a long time from the prior art. These are used for example in filling machines in order to distribute media, such as for example a beverage, from a stationary reservoir to a plurality of filling devices, such as for example filling valves.

In this case devices which are known from the prior art sometimes have a so-called inner distributor shaft which introduces media such as the product to be bottled or another liquid from a stationary part such as a valve manifold of the apparatus into the rotating part. In addition this distributor shaft may also serve to ensure an initial tension, a relief of strain or an application of a vacuum. Since this distributor shaft or at least surfaces of these distributor shafts come into contact with the product and other media, this distributor shaft usually has coatings in order to extend the operating time.

It is also possible for this distributor shaft to be recoated again in order in this way to achieve a virtually new shaft which is again ready for a predetermined number of hours of operation. However, problems occur with the coating due to aggressive products, such as for example salt-containing drinks, energy drinks, osmosis water, etc. However, these problems occur quite predominantly in the region in contact with the product, in which these products lead to sub-surface collision and the coatings can form bubbles, parts can flake off, etc. In particular running surfaces of rotary seals can also be destroyed thereby, so that reliable sealing between fixed and rotating parts of the rotary distributor may no longer be possible.

In the prior art attempts have already been made to work with the most varied base materials and also with different coatings. However, it has been shown that the problem can usually only be remedied with the most precious and thus most expensive materials in each case. Thus, however, the prices for such distributor shafts fluctuate by a factor of 1:6 and furthermore these costs constitute a considerable factor in the costs of the respective machine.

Furthermore, if the complete distributor shaft is made of a precious material, for reasons of cost attempts will be made to order the round material individually, in order thus to perform the coating with the least possible expense. However, this increases the processing time for completion of the component, because the material is so hard and is difficult to process.

The object of the present invention therefore is in particular to reduce the costs for such devices and in particular such distributor shafts. This object is achieved according to the invention by the subject matter of the independent claims. Advantageous embodiments and modifications are the subject of the subordinate claims.

A rotary distributor according to the invention for distributing free-flowing media has a distributor shaft as well as a distributor head, wherein this distributor head is rotatable relative to the distributor shaft and relative to a predetermined axis of rotation. Furthermore the distributor head has at least one first inlet opening for delivering the free-flowing medium and preferably a plurality of outlet openings for discharging the free-flowing medium, wherein a flow connection exists between this inlet opening and the outlet openings.

According to the invention the distributor shaft has at least one first distributor shaft segment and one second distributor shaft segment, wherein the second distributor shaft segment is releasably disposed on the first distributor shaft segment and the second distributor shaft segment adjoins the first distributor shaft segment in the direction of the axis of rotation and wherein the second distributor shaft is disposed nearer to the distributor head than the first distributor shaft segment. In addition, at least the second distributor shaft segment has a surface facing the free-flowing medium and the first distributor shaft segment as well as the second distributor shaft segment differ from one another with regard to their materials and/or with regard to a surface coating.

It is therefore proposed that the distributor shaft is not constructed in one piece as in the prior art but in at least two parts. In other words the upper region which in particular is in contact with the product can be decoupled from a lower part of the distributor shaft. In this case it would for example be possible that the upper product region is designed appropriately with regard to its base material, i.e. with correspondingly precious materials, and that otherwise the entire distributor shaft does not have to be made of this precious material.

Thus for example the first distributor shaft segment, which is for example a lower distributor shaft segment in the assembled state, could be equipped with deep holes and fit sizes, but for this a more favourable and more easily processed standard material could be used. Only the upper region which is in contact with the product and leads to problems for example on the running surfaces of sealing means may be appropriately implemented with precious materials. In addition, however, it would also be possible that the two segments differ with regard to their coating or for example only the second distributor shaft segment has a coating but the first segment does not. It would also be possible to produce the second distributor shaft segment in a standard material, but to coat the complete region in contact with the product to be coated, in order to prevent sub-surface corrosion.

In this way it is possible that, in particular if more favourable devices are required, costs savings can be made and in this way problems with the machines can also be dealt with more flexibly and more favourably. If the shaft distributor segments differ with regard to their material it is possible with the invention that only a small part has to be produced with the respective precious material. If a coating is provided in particular in the region of the second distributor shaft segment, this coating can prevent the contact with the (optionally less precious) basic material.

Thus it is proposed within the scope of the invention that at least alternatively the two distributor shaft segments are produced from different materials or differ with regard to the coating. The expression "differ with regard to the coating" may be understood to mean that the surfaces of the two distributor shaft segments have different coatings, but it would also be conceivable and preferable that only the second distributor shaft segment has a coating but the first distributor shaft segment does not. Also the said measures could be combined, i.e. the distributor shaft segments may not only have different materials but also may differ with regard to the coating (for example the presence or absence of a coating).

In addition it would also be possible that the coatings on the distributor shaft segments differ with regard to their coating thickness and/or a coating material.

The present invention can be used in particular for filling machines, but use in other machines would also be conceivable, in which likewise distribution takes place from a central reservoir to a plurality of stations, such as for example sterilisation machines, blow moulding machines and the like. The free-flowing medium may in particular be a liquid, but an application to other media would also be conceivable, such as for example gases, rinsing media and the like.

In a further preferred embodiment the second distributor shaft segment forms a channel for conveying the free-flowing medium (thus it is designed in particular as a hollow shaft segment) and a wall surrounding this channel is closed, i.e. designed without openings. Also such openings constitute weak points with regard to contact with a product. Accordingly, however, the first distributor shaft segment may have such openings.

In a further advantageous embodiment the device has at least one further delivery line for a further medium, wherein also this further medium can be delivered to the distributor head. This further medium may for example involve additional components for a beverage, but also compressed gases, sterilising agents or cleaning agents. In the event of a hot air filling of beverages such a further delivery line may also serve for product circulation. In this case in an advantageous further development this media-conveying region can also be embodied in the design according to the invention.

In a further advantageous embodiment the distributor shaft forms an inner channel through which the product flows.

In a further advantageous embodiment the first distributor shaft segment also has a surface facing the free-flowing medium. Thus in this embodiment the free-flowing medium first of all flows through the first distributor shaft segment and then through the second distributor shaft segment. In this case in particular the said surface, i.e. the surface facing the product, also comes directly into contact with the free-flowing medium.

In a further advantageous embodiment the second distributor shaft segment also has a coating on the surface facing the free-flowing medium. Due to this coating—as mentioned above—the durability of this second distributor shaft segment can be improved.

However, in a preferred embodiment this coating also extends into surface regions of the second distributor shaft segment which are not reached by the free-flowing media. This particularly preferable embodiment is based on the idea that the surfaces are particularly susceptible in particular also in the regions in which the coating ends.

Thus it is proposed here that such a transition from a coating into an uncoated region is shifted into a region which cannot be reached and/or contacted by the free-flowing medium, for example a region which is located beyond a seal which prevents access of the free-flowing medium to the respective region.

A sealing means is preferably disposed between the first distributor shaft segment and the second distributor shaft segment. In this case it is for example possible that the two distributor shaft segments are disposed directly on one another and thus surfaces of these two distributor shaft segments bear directly against one another. In order to prevent the entry of media into a contact region of the two distributor shaft segments, a sealing means can be provided for instance in the form of an O ring. In a further advantageous embodiment at least one region of a surface of the second distributor shaft segment is coated, which surface bears against a surface of the first distributor shaft segment. As just described, this region usually cannot come into contact with the free-flowing medium, in particular if this is prevented by a sealing means. Thus, however, the transition region between a coated and an uncoated region cannot come into contact with the free-flowing medium or also other media. Thus a coating preferably extends beyond this sealing means, so that in particular the beginnings of the coating cannot be attacked by the product.

In a further advantageous embodiment the second distributor shaft segment is made of a material which is selected from a group of materials which includes the stainless steels 1.4301, 1.4404, 1.4435, 1.4539, 1.4552, 1.4581, 1.4439, 2.4856.

The first distributor shaft segment is made of a material which is selected from a group of materials which includes the stainless steels 1.4301, 1.4404, 1.4435, 1.4539, 1.4552, 1.4581, 1.4439, 2.4856.

In a further advantageous embodiment at least one coating is selected from a group of coatings which includes ceramic coatings, metal coatings and plastic coatings and the like, in particular RZ100/4 chromium oxide as well as RX50, RX55, RX70 and RX75 in each case in a layer thickness from 0.1 to 0.4 mm.

In a further advantageous embodiment a first sealing means is disposed on at least one surface portion of the second distributor shaft segment. This sealing means is advantageously disposed radially outside this distributor shaft segment or a region of the distributor shaft segment. In operation, the liquid can in particular reach as far as this seal. This region of the distributor shaft segment is particularly sensitive and therefore preferably at least this region is made of the precious material and/or provided with a corresponding coating. This sealing means is preferably located on a circumferential wall which delimits the inner channel of the second distributor shaft segment. In particular the sealing means is located on a surface of the second distributor shaft segment which does not delimit a channel through which the free-flowing medium flows.

In a further advantageous embodiment the sealing means is a sliding seal. Furthermore it would also be possible for a lubricant also to be delivered to a region of this seal.

In a further advantageous embodiment a bearing arrangement is also disposed on the second distributor shaft segment (or rests against it). In this case it is in particular possible for a first bearing arrangement to be supported on the second distributor shaft segment in order thus to mount a rotatable region of the rotary distributor rotatably relative to this second distributor shaft segment. The apparatus advantageously has a further bearing arrangement and this is preferably offset along the direction of rotation with respect to the first bearing arrangement and particularly preferably this second bearing arrangement is disposed on the first distributor shaft segment.

In a further advantageous embodiment at least one section of the second distributor shaft segment is located on the distributor head and/or is immediately adjacent to at least a region of the distributor head. Nevertheless liquid can pass through in this region in which the section of the second distributor shaft segment bears against the distributor head, so that here too a particularly sensitive region is produced. Advantageously at least this region is made of the said precious material and/or has a coating.

In a further preferred embodiment a region of an outer surface of the second distributor shaft segment is also provided with a coating. Advantageously, however, a region of the outer surface of the second distributor shaft segment is uncoated. Advantageously the coating of the outer surface of the second distributor shaft segment extends from regions which can be reached by the free-flowing medium even into regions which cannot be reached by the free-flowing medium.

A sealing means is advantageously located at least on a coated region of the outer surface of the second distributor shaft segment.

Furthermore the present invention is directed to a filling device. This has a rotatable carrier on which a plurality of filling elements are disposed. According to the invention the filling device has a rotary distributor of the type described above which distributes a liquid to be bottled to the individual filling elements or transfers this liquid into a product receiver vessel such as a ring bowl.

Furthermore the present invention is directed to a distributor shaft for distributing free-flowing media, wherein the distributor shaft is constructed at least in some sections as a hollow shaft with a channel for conveying the free-flowing medium and the distributor shaft has at least one first distributor shaft segment and one second distributor shaft segment, wherein the second distributor shaft is releasably disposed on the first distributor shaft segment and the second distributor shaft segment adjoins the first distributor shaft segment, and wherein at least the second distributor shaft segment has a surface facing the free-flowing medium and wherein the first distributor shaft segment and the second distributor shaft segment differ with regard to their materials and/or with regard to a surface coating.

In an advantageous embodiment both the first distributor shaft segment and also the second distributor shaft segment have a channel for conveying the free-flowing medium. This free-flowing medium is in particular a liquid. A cross-section of the channel formed in the first distributor shaft segment for conveying the free-flowing medium is preferably the same as a channel formed in the second distributor shaft segment. The first distributor shaft segment and/or the second distributor shaft segment is advantageously constructed in one piece.

The distributor shaft is preferably designed in the manner described above.

Further advantages and embodiments are apparent from the appended drawings.

In the drawings:

FIG. 16 shows a sectional representation of the second distributor shaft segment;

FIG. 17 shows an outer view of the second distributor shaft segment; and

FIG. 18 shows a roughly schematic representation of a filling device according to the invention.

Figure 1A:
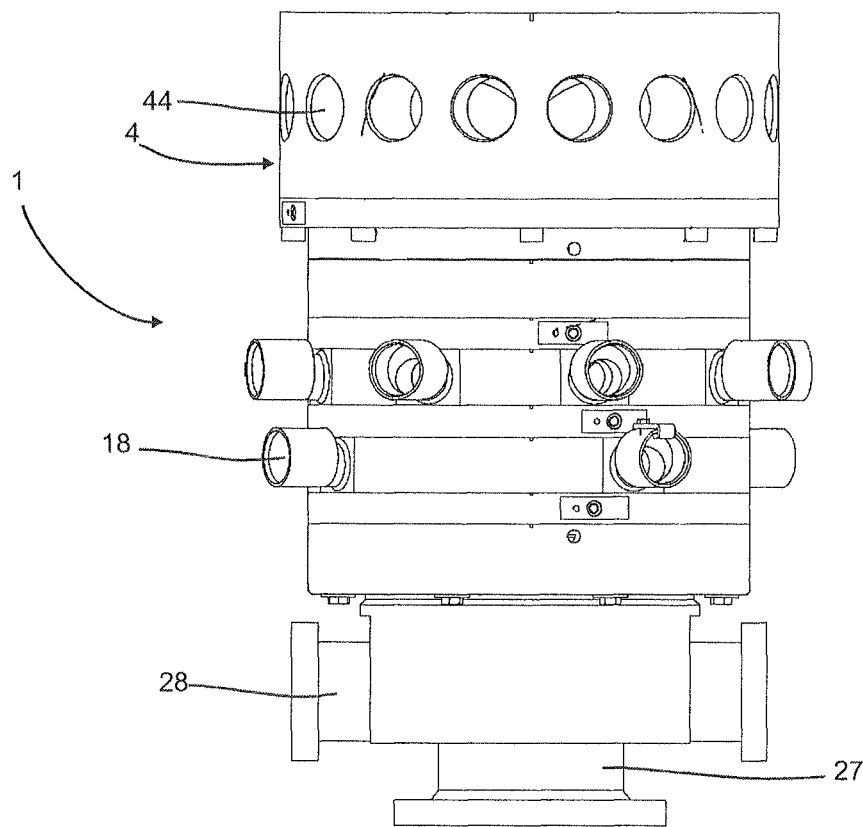
FIGS. 1a, 1b show two representations of a rotary distributor according to the invention.
Figure 1B:
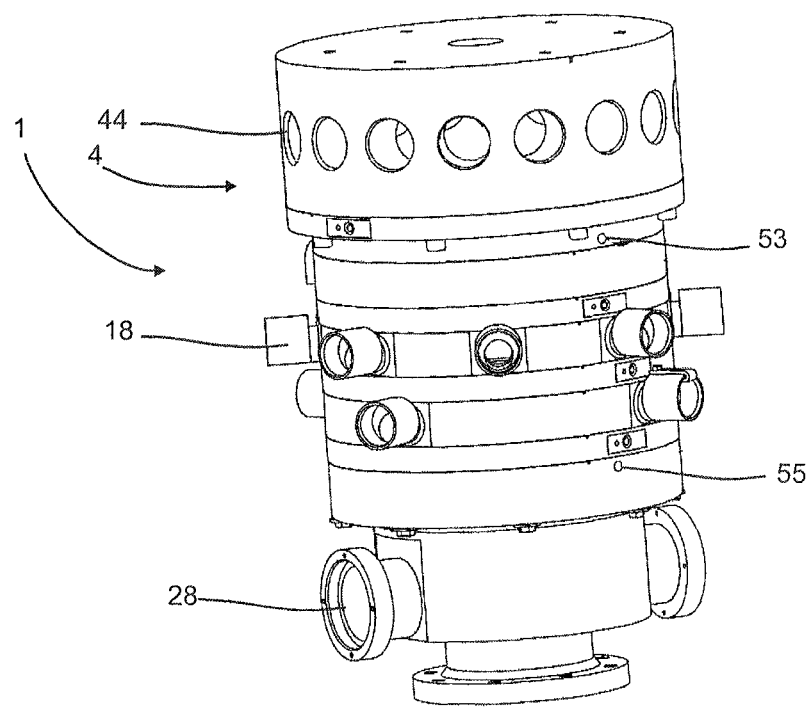

FIGS. 1a, 1b show two representations of a rotary distributor 1 according to the invention. This rotary distributor 1 has a distributor head 4 which is disposed rotatably and a plurality of discharge openings 44 which for example in the case of a filling machine can convey liquids to filling elements. The reference numeral 27 designates a delivery device to deliver a free-flowing medium and in particular a product to be bottled. Further media, such as for example cleaning (CIP) media, can be delivered by means of a further delivery opening 28. The reference numeral 18 designates a further delivery opening, by means of which for example further media can be delivered to the rotary distributor, such as for example additional beverage components, gases and the like.

Figure 2:
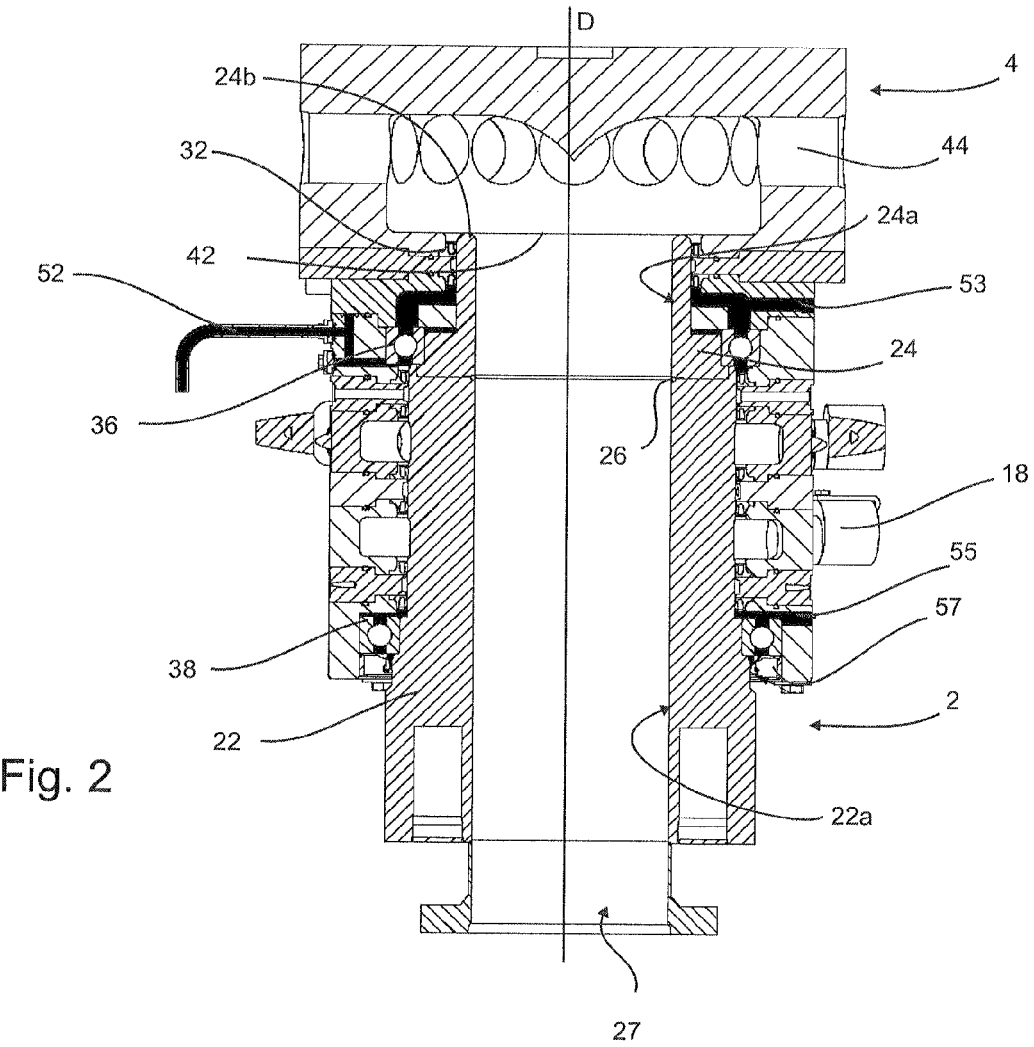
FIG. 2 shows a simplified sectional representation of the rotary distributor shown in FIG. 1.

FIG. 2 shows a sectional representation of the rotary distributor 1 shown in FIG. 1. Here too the distributor head or the distributor element 4 is provided or illustrated, as well as one of the discharge openings 44. In addition the distributor head also has a delivery opening 42, by means of which the free-flowing medium is delivered to the distributor head 4. This opening is in flow connection here with the individual discharge openings 44.

The reference numeral 2 designates a distributor shaft which here is composed of a first distributor shaft element 22 and a second distributor shaft element 24. These two distributor shaft elements 22, 24 are screwed to one another here by means of screw connections. The reference numeral 36 designates a bearing which serves for rotatable mounting of the distributor head 4 here relative to the second distributor shaft element 24. The reference numeral 22a designates a surface and in particular an inner surface of the first distributor shaft segment 22. In this case this surface is contacted by the free-flowing medium. The reference numeral 24a relates to a surface or inner surface of the second distributor shaft segment 24, which is likewise contacted by the product to be bottled. In the case of the second distributor shaft segment, however, the liquid to be bottled or the free-flowing medium (although unwanted) also flow away by means of the curved circumferential end face 24b of the second distributor shaft segment 24.

The reference numeral D designates the axis of rotation with respect to which the distributor head 4 is rotatable.

The reference numeral 53 designates a discharge opening by means of which a lubricant can be delivered to the apparatus. This lubricant is shown here in black. However, the lubricant is prevented from entering the region in which the free-flowing medium, for example the beverage, can be located. In this case a circumferential sealing means 32 in the form of a slide ring seal is provided, which seals the region located above this seal 32 from the region located below the seal.

The reference numeral 38 designates a further bearing arrangement, which serves for rotatable mounting of regions such as for instance the rotary distributor relative to the first distributor shaft segment 22. The reference numeral 52 designates an outlet for discharging lubricant for example after a lubrication procedure. A lubricant can likewise be delivered via a further opening 55 to the bearing 38. A sealing means 57, such as for example a labyrinth seal, is provided below the bearing 38.

In the region of this sealing means 57 a grease outlet can also be provided, so that in this region an inspection point is also provided by means of which the proper lubrication can be checked. These two openings 53, 55 for delivery of lubricant can also be seen in FIG. 1b. In this case the respective bearing spaces can be filled with a lubricant, such as for example grease, during the assembly of the rotary distributor.

Figure 3:
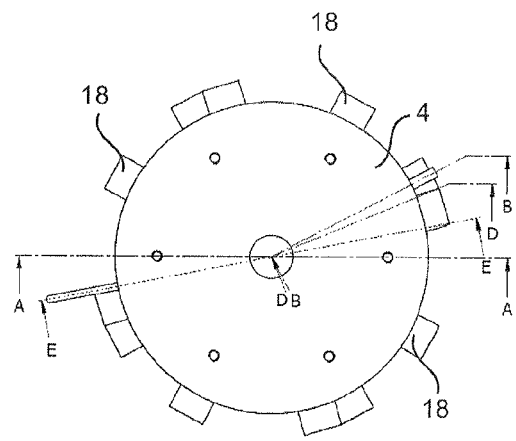
FIG. 3 shows a plan view of the rotary distributor of FIG. 2.

FIG. 3 shows a plan view of the rotary distributor arrangement of FIG. 2. This shows the plurality of lateral outlets 18 by means of which for example further media can be delivered.

Figure 4:
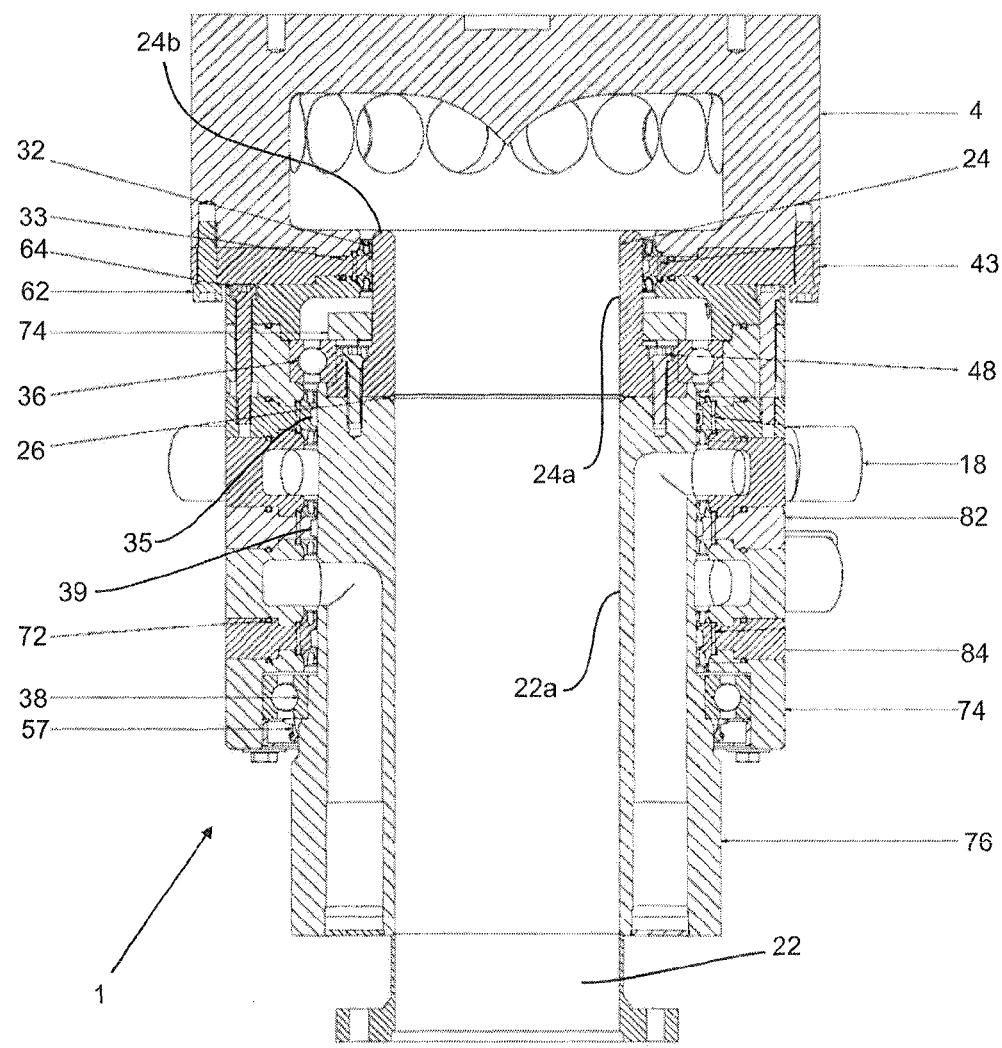
FIG. 4 shows a further sectional representation of a rotary distributor.

FIG. 4 shows a further representation of a rotary distributor according to the invention. In this representation the distributor head 4 can again be seen as well as the upper distributor shaft segment 24, which is disposed by means of screw connections 48 on the first distributor shaft segment 22. A sealing means 26, for instance in the form of an O ring, is provided between the two distributor shaft segments 22, 24. This is situated between the two distributor shaft segments. It will be seen that in operation the free-flowing medium, such as for example the product, can pass over a rounded portion 24b (or a round end surface) of the second distributor shaft segment 24 and ultimately can reach as far as the sealing means 32. The reference numeral 33 designates a further sealing element which, however, can be taken out during dismantling for instance for replacement of the sealing element 32. The reference numeral 74 designates a bearing clamp ring which serves for fixing the bearing means 36. A further sealing means 35 is provided below the bearing arrangement 36. The reference numeral 39 likewise designates a sealing means. However, these two sealing means, which are preferably likewise sliding seals, rest against the first distributor segment.

The reference numerals 43, 62, 64, 72, 76, 82 and 84 designate further connecting components which enable the multi-part construction of the distributor head 4.

Figure 5:
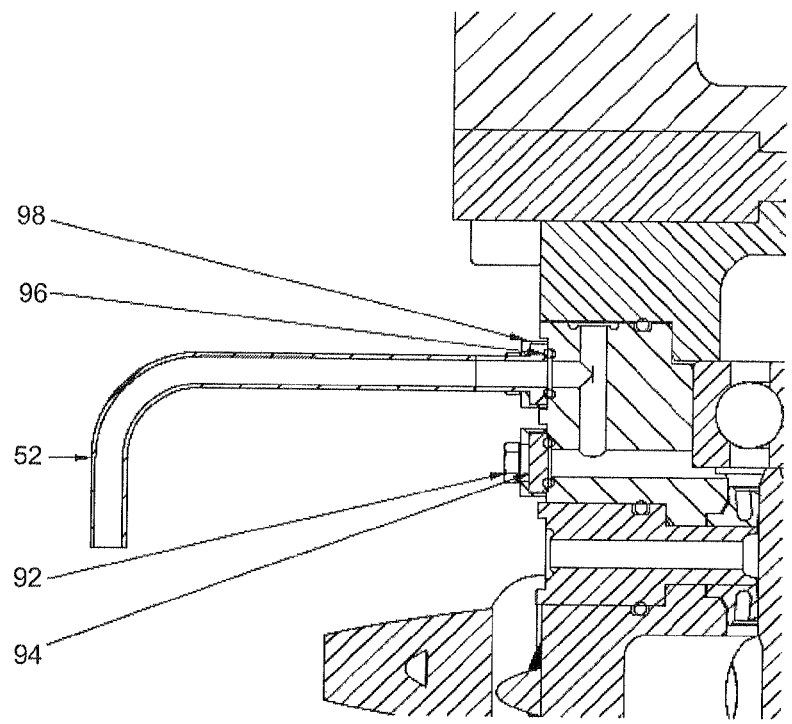
FIG. 5 shows a detail view of the rotary distributor shown in FIG. 4.

FIG. 5 shows an enlarged view of the representation shown in FIG. 2. In this case a closure element 94 is also provided, by which a lubricant channel can be closed. The reference numeral 92 designates a corresponding screw body for opening this opening. Also the discharge device 52 is disposed by means of a sealing means 96 and a closure element 98 on the apparatus. Alternatively the lubricant channel with feed 53 and discharge 52 can serve not only for lubrication but also for rinsing of the bearing 36.

Figure 6:
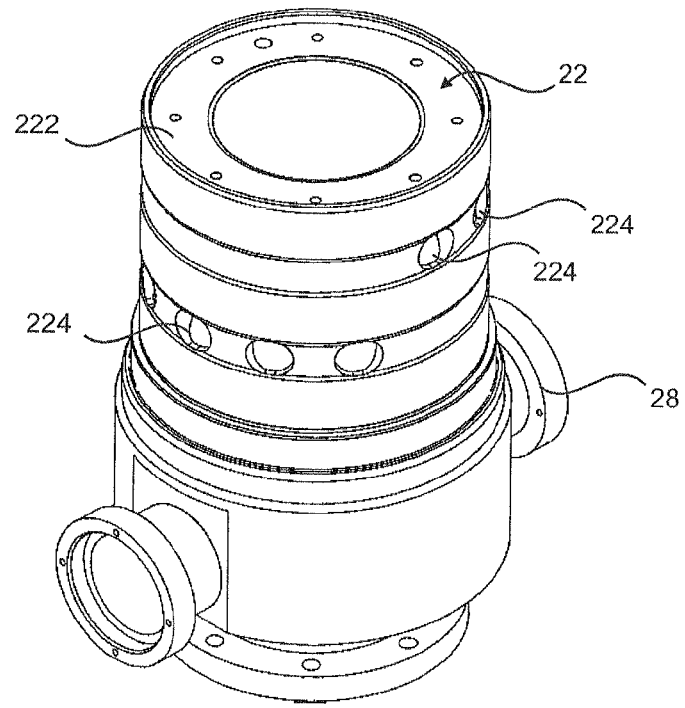
FIG. 6 shows a representation of a first distributor shaft segment.

FIG. 6 shows a perspective representation of the first distributor shaft segment 22. This distributor shaft segment 22 has a surface 222 which in operation rests against a corresponding surface of the second distributor shaft segment (not shown in FIG. 6). Furthermore in the first distributor shaft segment a plurality of openings 224 are provided which are in flow connection with the connections 18 shown in FIG. 2. On the other hand the second distributor shaft segment has no openings in a circumferential direction extending with respect to the axis of rotation, but only a channel extending in the direction of the axis of rotation.

Figure 7:
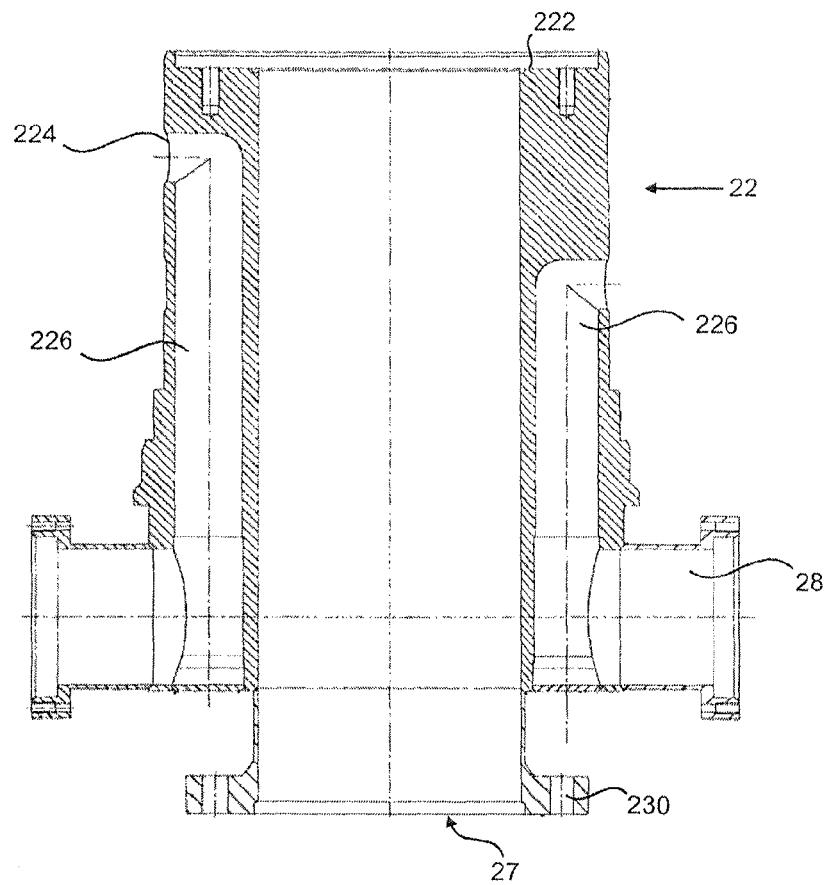
FIG. 7 shows a sectional representation of the distributor shaft segment shown in FIG. 6.

FIG. 7 shows a sectional representation of the first distributor shaft segment 22 shown in FIG. 6. It can also be seen here that this distributor shaft segment has channels 226 extending in the interior for conveying a rinsing agent. By means of openings 230 the first distributor shaft segment 22 can for example be flange-mounted on a valve manifold for bottling the liquid. In addition, the surface 222 can also be seen again, on which the first distributor shaft segment 22 and the second distributor shaft segment 24 (not shown) are joined together. The channels 226 preferably extend parallel to the above-mentioned axis of rotation D.

Figure 8:
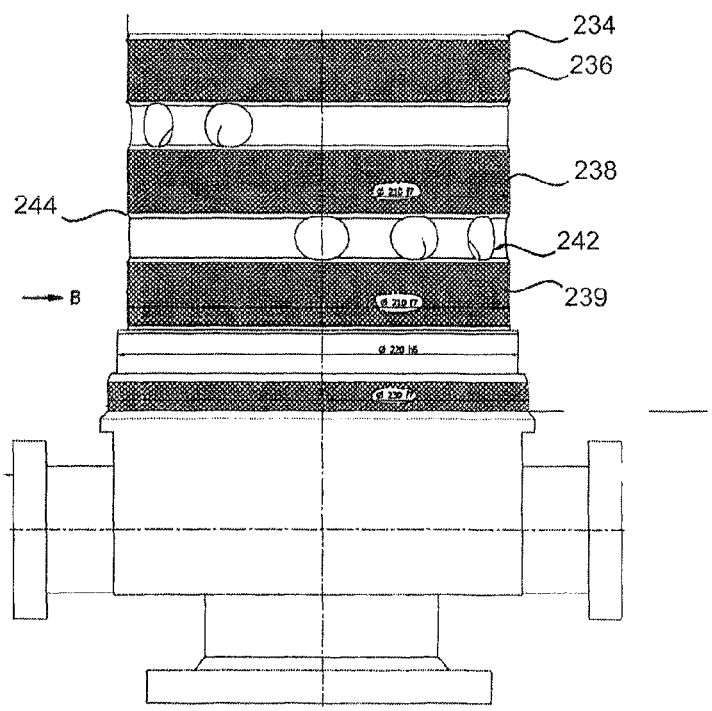
FIG. 8 shows a further representation of the first distributor shaft segment.

FIG. 8 shows a further representation of the first distributor shaft segment. A plurality of surfaces 236, 238, 239 can be seen here which are formed in a ring in the circumferential direction. These surfaces have a coating. This is advantageously a coating of chromium oxide. The individual openings 224 can be seen between these coated surfaces. The reference numeral 234 and 244 designate edges between the coated surfaces 238 and the annular regions with the openings 224. These edges advantageously have rounded shapes.

Figure 9:
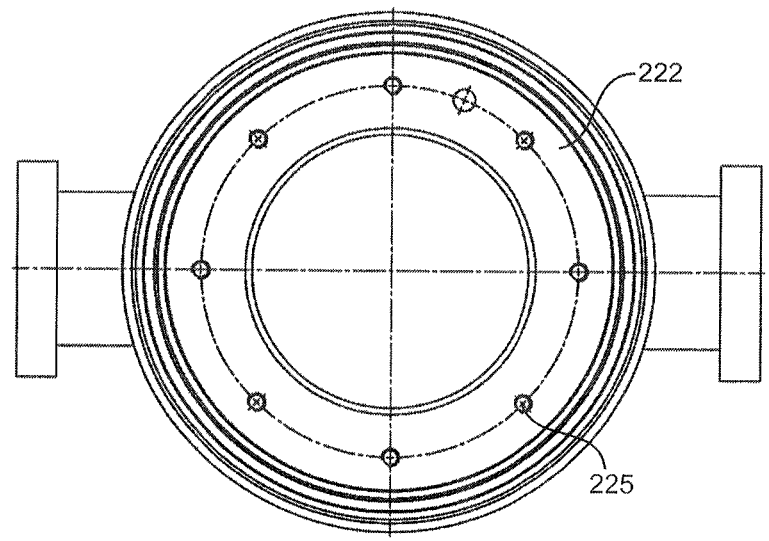
FIG. 9 shows a view from above of the first distributor shaft segment.

FIG. 9 shows a plan view from above of the first distributor shaft segment 22. Here again the circumferential annular surface 222 can be seen. A plurality of holes 225 through which screw connections can be led are located in the region of this surface 222.

Figure 10:
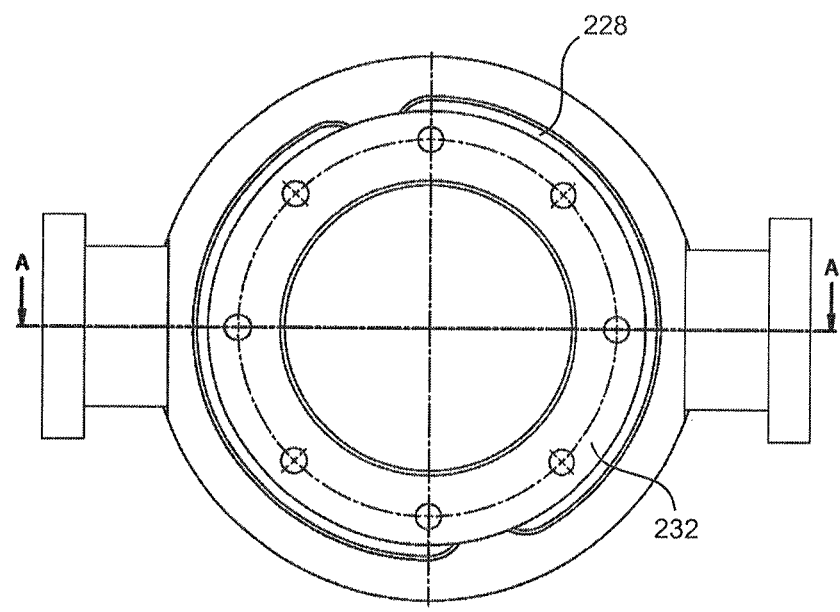
FIG. 10 shows a representation from below of the first distributor shaft segment.

FIG. 10 shows a view of the first distributor shaft segment from below. Here too an annular surface 232 is provided which can serve for flange mounting of further elements.

Figure 11:
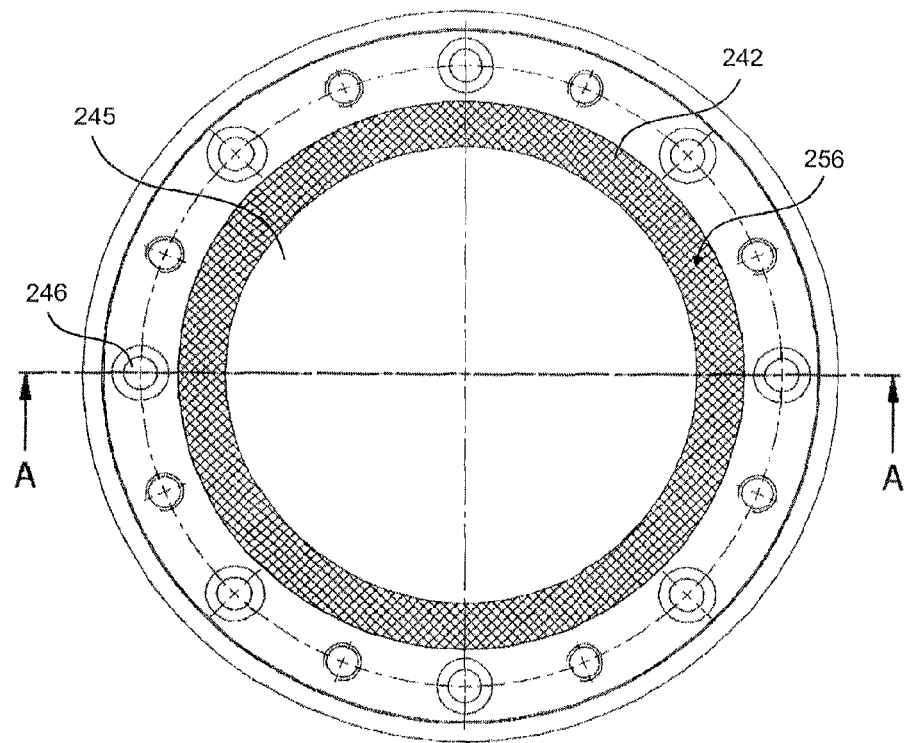
FIG. 11 shows a plan view from above of the second distributor shaft segment.

FIG. 11 shows the second distributor shaft segment in a view from above. In this case a circumferential wall 242 which surrounds the channel 245 can also be seen.

Figure 12:
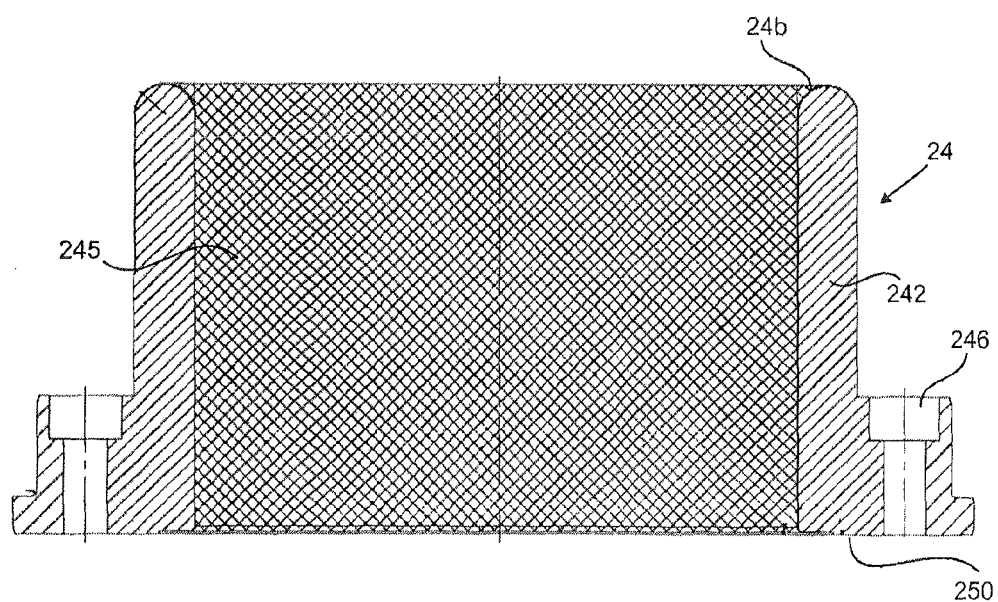
FIG. 12 shows a sectional representation of the second distributor shaft segment.

FIG. 12 shows a view of the second distributor shaft segment 24. This distributor shaft segment 24 has—as mentioned above—a circumferential wall 242 through which in turn a hollow space 245 is formed through which the medium to be bottled can flow. The wall 242 has on its upper edge a curved circumferential end surface 24b which in the operational state is located adjacent to a wall of the distributor head 4.

The reference numeral 246 relates to a hole with which the second distributor shaft segment 24 can be disposed on the first distributor shaft segment 22. The reference numeral 250 designates the surface which in the assembled state bears against the surface 222 of the first distributor shaft segment. FIG. 12 shows a corresponding side view of the second distributor shaft segment. The reference numerals 246 and 248 relate to holes which serve for fastening the distributor shaft segments 22, 24 to one another.

Figure 13:
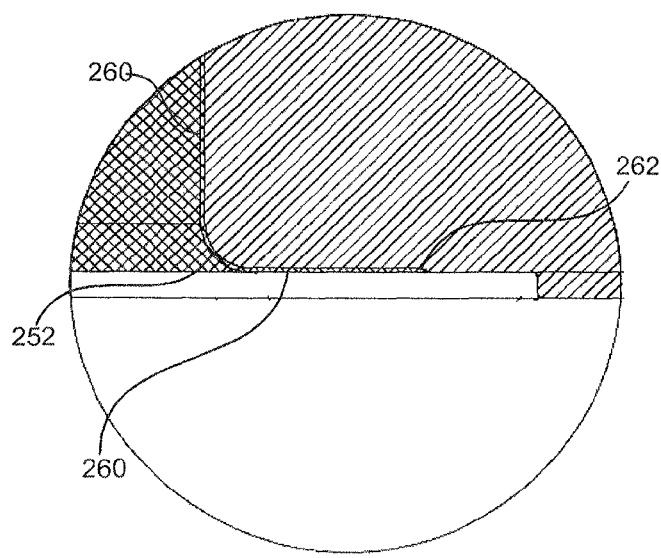
FIG. 13 shows an enlarged representation of the distributor shaft segment shown in FIG. 12.

FIG. 13 shows a detailed description of the side view shown in FIG. 12. In this case in particular a coating 260 can also be seen which is disposed on the circumferential wall 242. This coating also extends here beyond a curve 252 and thus in a region which in the operational state bears against the surface 222. Therefore an end point 262, which here in particular extends in the form of a ring, does not come into contact with the product to be bottled. However, in the radial direction the coating does not extend as far as the holes 246, 248.

Figure 14:
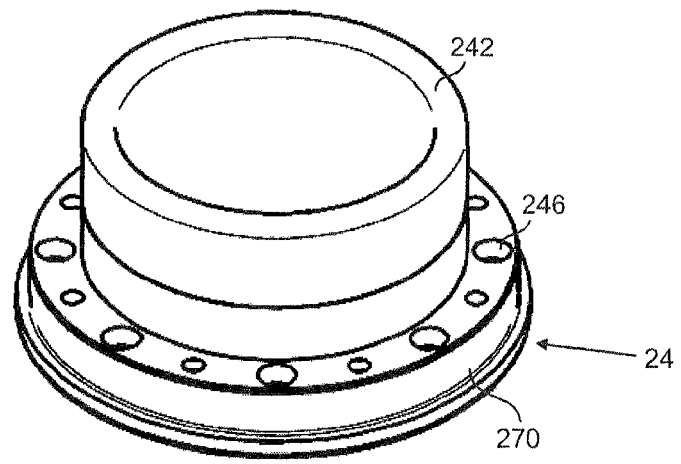
FIG. 14 shows a sectional representation of the second distributor shaft segment.

FIG. 14 shows a further perspective representation of the second distributor shaft segment 24. In particular it can be seen here that this distributor shaft segment has no openings disposed in the circumferential direction, by means of which a fluid communication is possible with the interior through which the product flows. In other words the circumferential wall 242 itself has no openings, whereas the corresponding circumferential wall of the first distributor shaft segment 22 (external) also has such lateral openings. Thus with regard to the flowing medium the second distributor shaft segment is constructed as a short closed pipe without lateral openings.

Also the second distributor shaft segment has, with the exception of the central channel, no internal channels for conveying the free-flowing medium.

Figure 15:
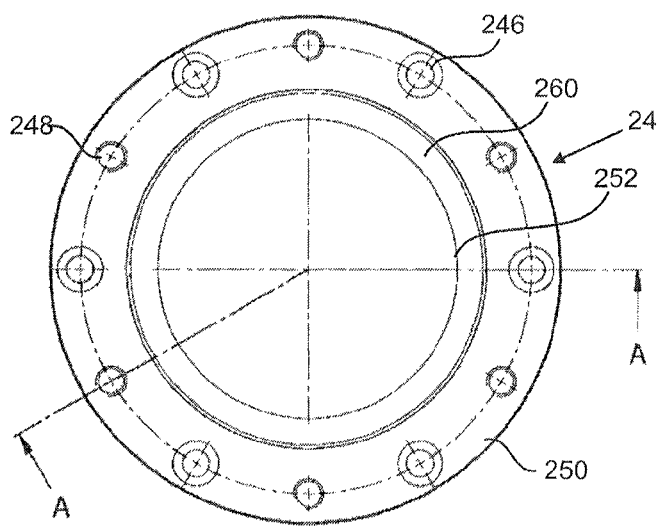
FIG. 15 shows a further representation from below of the second distributor shaft segment.

FIG. 15 shows a view from below of the second distributor shaft segment 24. The edge 252 can again be seen here. The coating can extend here from this edge 252—as mentioned above—further outwards, for example by a few millimeters or centimeters. As mentioned above, in the assembled state the surface 250 is located on a corresponding surface of the first distributor shaft segment 22 and therefore is not accessible for the product.

Finally, FIG. 16 shows a side view of FIG. 15 along the line AA. It will be recognised that the holes 246 are formed alternately and a total of six screw holes 246 are provided, with which the second distributor shaft segment 24 can be disposed on the first distributor shaft segment and six further holes 248 are provided which serve for fastening the annular body 74 shown in FIG. 4. Thus the second distributor shaft segment 24 has a circumferential ring 270 protruding in the radial direction. This ring in turn has—as illustrated—at least two different types of holes, wherein some of these holes are preferably formed as through holes and the others are formed as blind holes. These two types of holes advantageously alternate and these holes are also advantageously formed regularly around the external circumference of the ring 270.

FIG. 17 shows an outer view of the second distributor shaft segment 24. In this case the reference numeral 272 relates to a coating or a coated region. The reference numeral 274 designates an uncoated region disposed below the coated region 272. The coating may in turn be a coating of chromium oxide. Thus the coating of the outer surface of the second distributor shaft segment does not extend along the entire height of this distributor shaft segment but on the one hand in those regions which can be reached by the product. On the other hand, however, here too an outer coating also still goes beyond those regions which can be reached by the product. This arrangement of the coating is in particular suitable for a second distributor segment which has been produced from a higher-value material. In this way a substantial corrosion resistance is attained by the material selection. The additional coating in the region of the rotary seal improves the running characteristics of the sealing means on the shaft. The reference numeral 276 designates the end of the coating.

FIG. 18 shows a roughly schematic representation of a filling device 100. This filling device has a support 102 which is rotatable about the axis of rotation D on which a plurality of filling elements 104 which serve for filling containers 110. Furthermore the device has holding arrangements which hold the containers. In this case the containers are filled during transport.

The reference numeral 1 designates the rotary distributor described here which distributes the liquid to be bottled (for example a beverage) by means of conduits (not shown) to the individual filling elements 104. In this case the axis of rotation of the rotary distributor 1 and the axis of rotation of the support 102 coincide.

The applicant reserves the right to claim all the features disclosed in the application documents as essential to the invention in so far as they are individually or in combination novel over the prior art. Furthermore it is pointed out that in the individual drawings features were also described which may be advantageous per se. The person skilled in the art recognises immediately that a specific feature described in a drawing may also be advantageous without the incorporation of further features from this drawing. Furthermore the person skilled in the art recognises that advantages may also result from a combination of several features shown in individual drawings or in different drawings.

LIST OF REFERENCE NUMERALS 1 rotary distributor
2 distributor shaft
4 distributor head
18 delivery opening/connections
22 first distributor shaft segment
22a surface
24 second distributor shaft segment
24a surface
24b curved circumferential end surface of the wall 242
26 sealing means
27 delivery device
28 delivery opening
32 first radiation device/radiation source
33 further sealing element
34 bearing arrangement
35 further sealing means
36 bearing
38 further bearing arrangement
39 sealing means
42 inlet opening
44 discharge opening
48 screw connections
52 drain/discharge device
53 delivery opening
55 further opening
57 sealing means
74 bearing clamp ring
92 screw body
94 closure element
96 sealing means
98 closure element
100 filling device
102 support
104 filling element
110 containers
222 surface
224 openings
225 holes
226 channels
230 openings
232 surface
234, 244 edges
236, 238, 239 surfaces
242 circumferential wall
245 hollow space/channel
246, 248 holes
250 surface
252 curve/edge
260 coating
262 end point
270 protruding ring
272 coating
274 uncoated region
276 end of the coating
D axis of rotation
AA line

The invention claimed is:
1. A rotary distributor for distributing free-flowing media with a distributor shaft and with a distributor head, which is rotatable relative to the distributor shaft with respect to a predetermined axis of rotation D, wherein the distributor head has at least one first inlet opening for delivering the free-flowing medium and a plurality of outlet openings for discharging the free-flowing medium and a flow connection exists between this inlet opening and the outlet openings, wherein the distributor shaft has at least one first distributor shaft segment and a second distributor shaft segment, wherein the second distributor shaft is releasably disposed on the first distributor shaft segment and the second distributor shaft segment adjoins the first distributor shaft segment in the direction of the axis of rotation D, and wherein the second distributor shaft segment is disposed closer to the distributor head than the first distributor shaft segment and wherein at least the second distributor shaft segment has a surface facing the free-flowing medium and wherein the first distributor shaft segment and the second distributor shaft segment differ with regard to their materials and/or with regard to a surface coating.

2. The rotary distributor according to claim 1, wherein the first distributor shaft segment also has a surface facing the free-flowing medium.

3. The rotary distributor according claim 1, wherein the second distributor shaft segment has a coating on the surface facing the free-flowing medium.

4. The rotary distributor according to claim 3, wherein the coating also extends in surface regions of the second distributor shaft segment which is not reached by the free-flowing medium.

5. The rotary distributor according to claim 1, wherein a seal is disposed between the first distributor shaft segment and the second distributor shaft segment.

6. The rotary distributor according to claim 1, wherein at least one region of a surface of the second distributor shaft segment, which surface bears against a surface of the first distributor shaft segment, is coated.

7. The rotary distributor according to claim 1, wherein the second distributor shaft segment is made of a material which is selected from a group of materials selected from stainless steel 1.4301, 1.4404, 1.4435, 1.4539, 1.4552, 1.4581, 1.4439 and 2.4856.

8. The rotary distributor according to claim 1, wherein at least one coating is selected from a ceramic coating, a metal coating and a plastic coating.

9. The rotary distributor according to claim 1, wherein a first seal is disposed on at least one surface portion of the second distributor shaft segment.

10. The rotary distributor according to claim 9, wherein the first seal is a sliding seal.

11. The rotary distributor according to claim 9, wherein a bearing arrangement bears against the second distributor shaft segment.

12. The rotary distributor according to claim 1, wherein at least one section of the second distributor shaft segment bears against the distributor head.

13. A filling device for filling containers with a rotatable support, on which a plurality of filling elements is disposed for filling the containers and with a rotary distributor according to claim 1, which distributes a medium to be bottled to the individual filling elements.

14. A distributor shaft for distributing free-flowing media, wherein the distributor shaft is constructed at least in some sections as a hollow shaft with a channel for conveying the free-flowing medium and the distributor shaft has at least one first distributor shaft segment and one second distributor shaft segment, wherein the second distributor shaft is releasably disposed on the first distributor shaft segment and the second distributor shaft segment adjoins the first distributor shaft segment, and wherein at least the second distributor shaft segment has a surface facing the free-flowing medium, and wherein the first distributor shaft segment and the second distributor shaft segment differ with regard to their materials and/or with regard to a surface coating.

* * * * *